United States Patent
Chen et al.

(10) Patent No.: US 10,063,640 B2
(45) Date of Patent: Aug. 28, 2018

(54) INTERNET OF THINGS COMMUNICATION AND CONTROL SYSTEM

(71) Applicant: Verizon Patent and Licensing Inc., Arlington, VA (US)

(72) Inventors: Zhong Chen, Acton, MA (US); William D. Walker, Hollis, NH (US); Jianxiu Hao, Acton, MA (US); Matthew J. Threefoot, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 14/928,494

(22) Filed: Oct. 30, 2015

(65) Prior Publication Data
US 2017/0126809 A1 May 4, 2017

(51) Int. Cl.
| | |
|---|---|
| *G06F 15/16* | (2006.01) |
| *H04L 29/08* | (2006.01) |
| *H04B 1/38* | (2015.01) |
| *H04L 12/28* | (2006.01) |
| *H04L 12/64* | (2006.01) |
| *H04W 4/70* | (2018.01) |

(52) U.S. Cl.
CPC ............. *H04L 67/125* (2013.01); *H04B 1/38* (2013.01); *H04L 12/2816* (2013.01); *H04L 12/6418* (2013.01); *H04W 4/70* (2018.02)

(58) Field of Classification Search
CPC ..... H04L 29/08; H04L 12/28; H04L 12/6418; H04L 12/2816; H04L 67/125; H04B 1/38
See application file for complete search history.

(56) References Cited

U.S. PATENT DOCUMENTS

| | | | |
|---|---|---|---|
| 9,716,675 B2* | 7/2017 | Choi | H04L 12/2816 |
| 2014/0207282 A1* | 7/2014 | Angle | H04L 12/282 |
| | | | 700/257 |
| 2015/0006695 A1* | 1/2015 | Gupta | H04L 41/32 |
| | | | 709/223 |

(Continued)

FOREIGN PATENT DOCUMENTS

| | | | |
|---|---|---|---|
| CN | 102566525 A | * | 7/2012 |
| CN | 102694706 A | * | 9/2012 |

(Continued)

*Primary Examiner* — Benjamin M Thieu

(57) ABSTRACT

A device may receive device information and operation information relating to an Internet of Things (IoT) device type corresponding to IoT devices that are configured to perform a particular operation based on receiving a particular command message. The device information may identify IoT devices of the IoT device type, and the operation information may identify operations that the IoT devices are capable of performing. The device may generate an application programming interface (API) based on the operation information. The API may associate the operations with one or more respective instructions, and may permit a client device to control operation of the IoT devices. An instruction, of the one or more respective instructions, when received by the device, may cause the device to cause a corresponding command message to be transmitted to an IoT device of the IoT devices. The device may store or provide the API.

20 Claims, 8 Drawing Sheets

(56) References Cited

U.S. PATENT DOCUMENTS

| | | | | |
|---|---|---|---|---|
| 2015/0161835 A1* | 6/2015 | Jablokov | ............. | G07C 9/00111 340/5.61 |
| 2015/0347114 A1* | 12/2015 | Yoon | ........................ | G06F 8/61 235/375 |
| 2016/0065653 A1* | 3/2016 | Chen | ....................... | H04L 67/10 715/735 |
| 2016/0072638 A1* | 3/2016 | Amer | ................... | H04L 12/2818 398/106 |
| 2016/0149836 A1* | 5/2016 | Narayanan | .............. | H04L 51/04 709/206 |
| 2016/0187862 A1* | 6/2016 | Nayak | .............. | H04N 21/41407 700/275 |
| 2016/0308972 A1* | 10/2016 | Ding | .................... | H04L 43/065 |
| 2017/0076590 A1* | 3/2017 | Chen | ....................... | G08C 17/02 |

FOREIGN PATENT DOCUMENTS

| | | | |
|---|---|---|---|
| CN | 203338122 U | * | 12/2013 |
| CN | 104898591 A | * | 9/2015 |

* cited by examiner

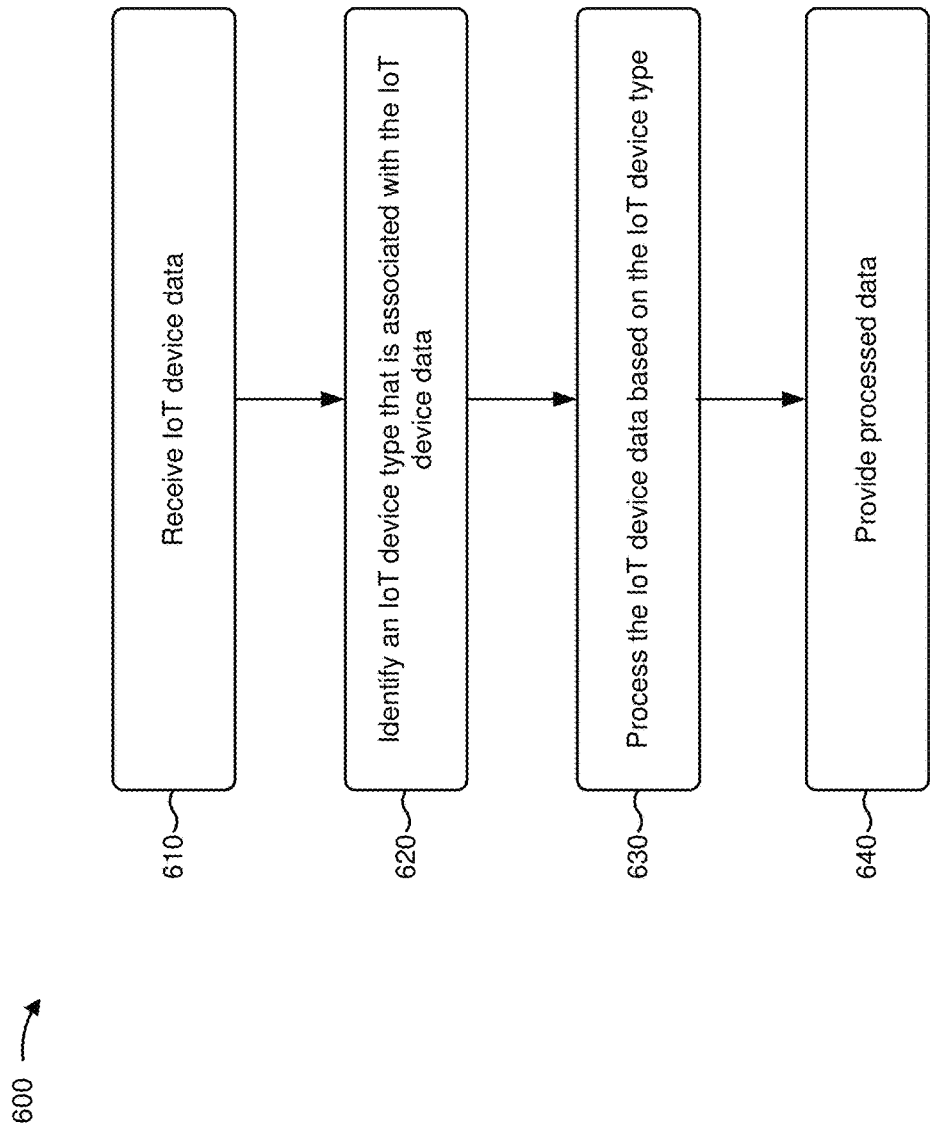

INTERNET OF THINGS COMMUNICATION AND CONTROL SYSTEM

BACKGROUND

An Internet of Things (IoT) device (e.g., a "thing" in the Internet of Things, such as an appliance, a smart light bulb, a smart thermostat, a temperature sensor, a pressure sensor, etc.) may perform functions based on receiving command messages. For example, the IoT device may collect and provide sensor information, may open or close a switch, or the like. Different IoT devices may be associated with different instructions, different data types, different information formats, different device libraries, or the like. In some cases, multiple IoT devices may be implemented in a particular environment (e.g., a house, a business, a building, a train stop, etc.).

BRIEF DESCRIPTION OF THE DRAWINGS

FIG. 6 is a flow chart of an example process for processing IoT device data based on an IoT device type.

DETAILED DESCRIPTION OF PREFERRED EMBODIMENTS

The following detailed description of example implementations refers to the accompanying drawings. The same reference numbers in different drawings may identify the same or similar elements.

An IoT device (e.g., a smart device, such as a smart light bulb, a smart refrigerator, a sensor, a medical device, etc.) may provide information to and/or receive information from another device using a particular messaging protocol, data format, device library, instruction, or the like. Different IoT devices may use different messaging protocols, data formats, device libraries, instructions, or the like. Therefore, a device that interacts with a variety of IoT devices may require specialized configuration for each IoT device with which the device interacts.

Implementations described herein enable a modem control device to communicate with and control a variety of IoT devices via an IoT modem by causing the IoT modem to transmit control messages to one or more of the IoT devices. In some implementations, the modem control device may be associated with an application programming interface (API) that permits client devices, or other types of devices, to interact with the variety of IoT devices via the modem control device. In some implementations, an API may be associated with an IoT device type, and IoT devices, corresponding to the IoT device type, may be configured to interact with the modem control device in a fashion that permits the IoT devices to be controlled by the modem control device. For example, configuration of the IoT devices may be standardized based on the API, which conserves processor resources for devices that are communicating with and/or controlling the IoT devices based on the API.

In this way, the modem control device saves processor resources, programming time, and money by permitting a variety of devices to control IoT devices via the modem control device and/or the IoT modem, rather than configuring each device to transmit different control messages to different IoT devices.

Figure 1A:
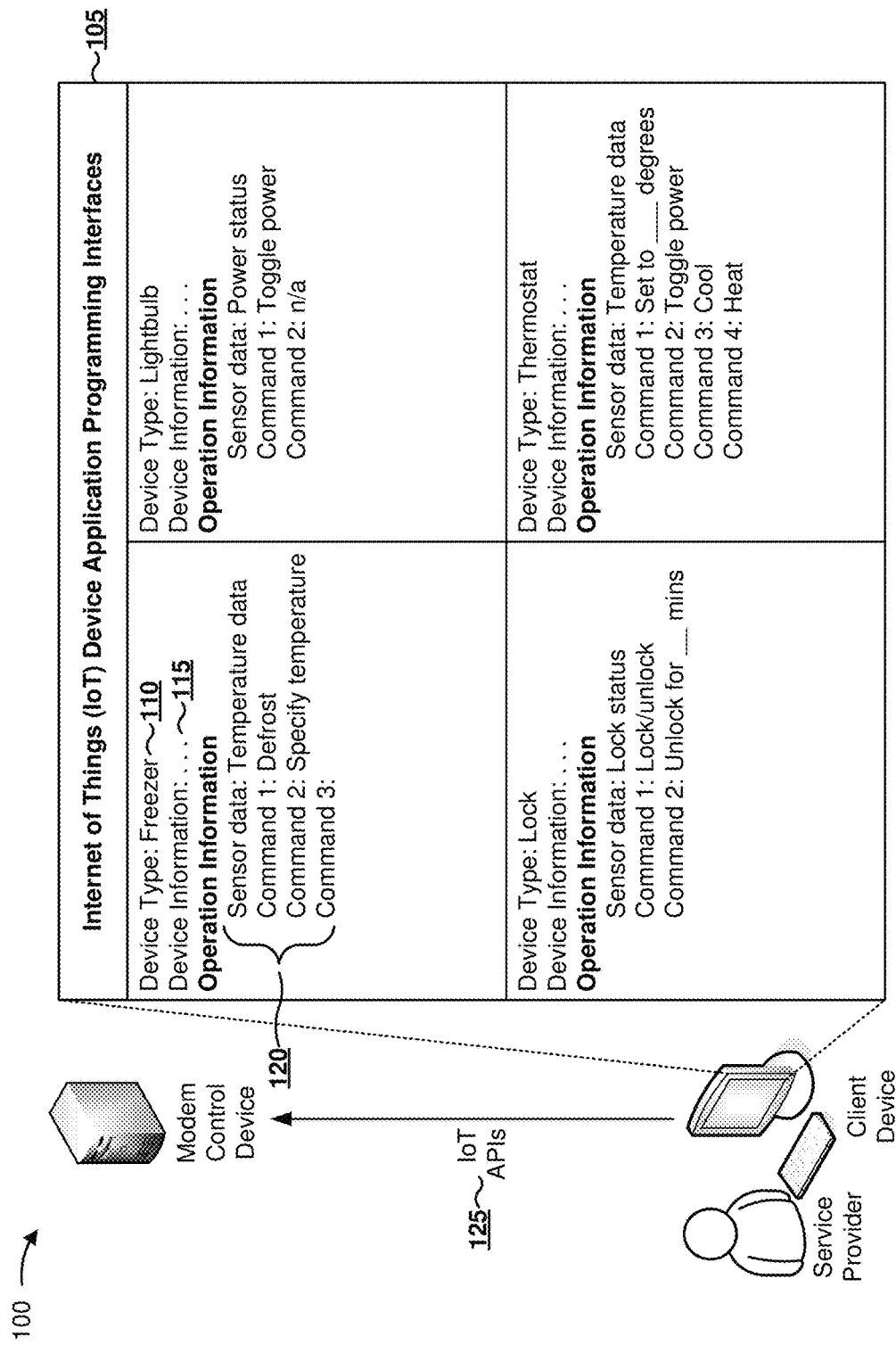
FIGS. 1A-1C are diagrams of an overview of an example implementation described herein.
Figure 1B:
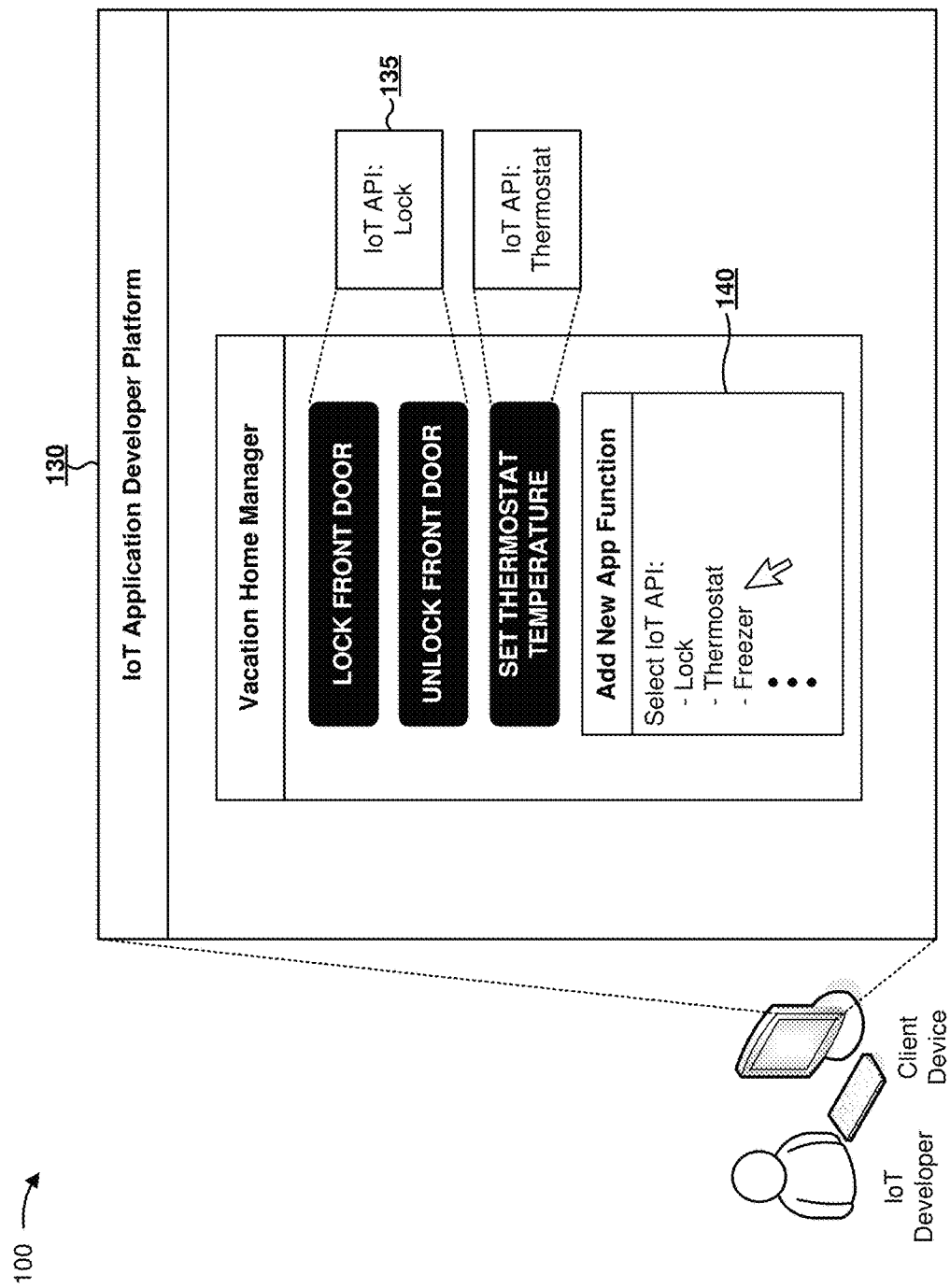
Figure 1C:
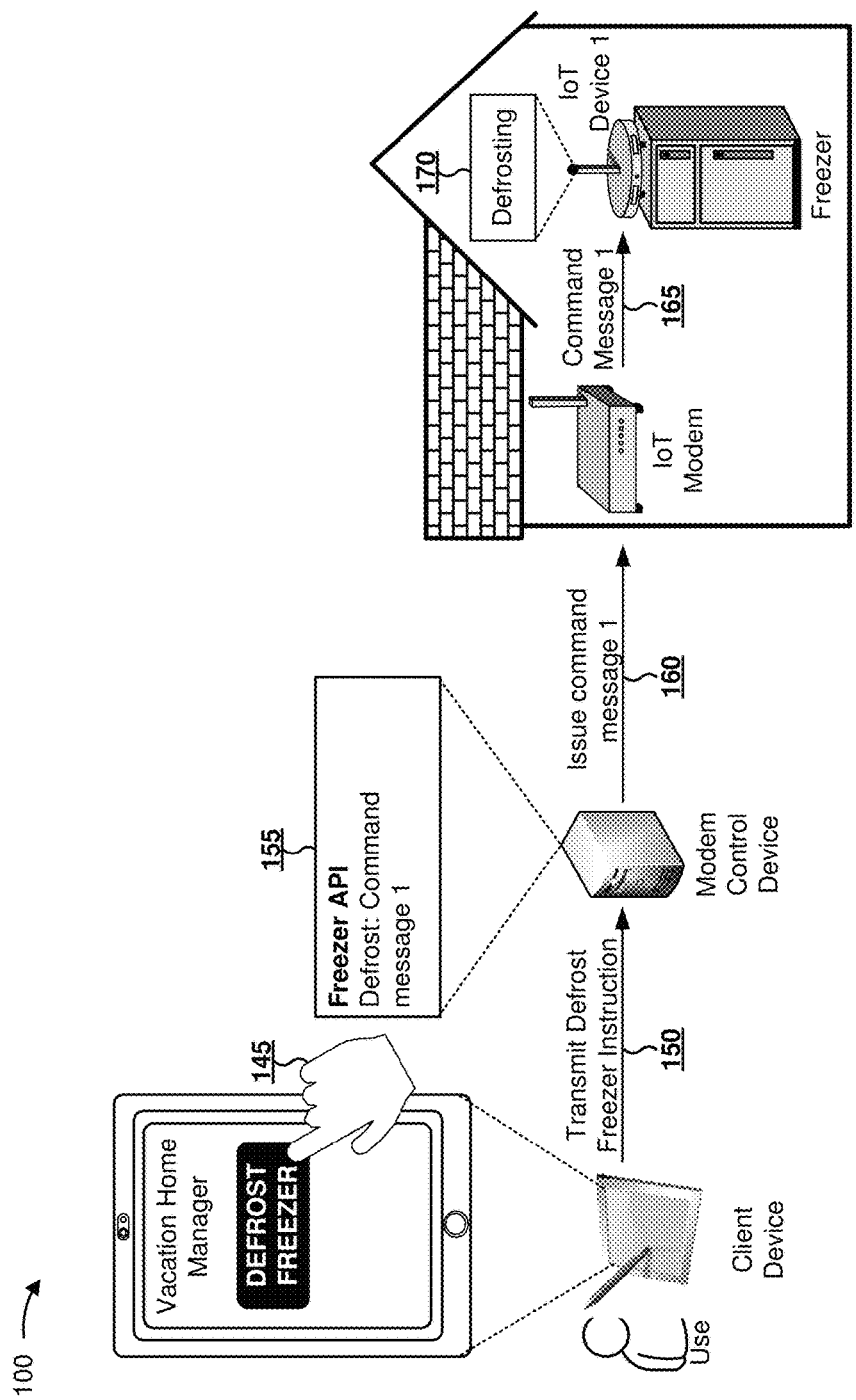

FIGS. 1A-1C are diagrams of an overview of an example implementation 100 described herein. As shown in FIG. 1A, and by reference number 105, a service provider may configure IoT device APIs corresponding to IoT device types. For example, the service provider may specify APIs based on which to interact with IoT devices corresponding to IoT device types. As shown by reference number 110, each IoT device API may be associated with an IoT device type. Here, the service provider specifies IoT device APIs for IoT device types of freezer, lightbulb, lock, and thermostat. In some implementations, an IoT device type may include IoT devices that are configured to perform a particular operation based on receiving a particular command message. For example, if a set of IoT devices can set a temperature setting based on receiving a particular command message, the set of IoT devices may correspond to a particular IoT device type. Additionally, or alternatively, an IoT device type may correspond to IoT devices associated with a particular manufacturer, a particular firmware version, or the like.

As shown by reference number 115, the service provider may provide device information identifying IoT devices that correspond to the IoT device type. The device information may include, for example, device identifiers (e.g., model identifiers, serial identifiers, information identifying manufacturers, etc.), network addresses of IoT devices, or the like, as described in more detail below.

As shown by reference number 120, the service provider may provide operation information for each IoT device type. As shown, in some cases, the operation information may identify sensor data associated with an IoT device type. For example, IoT devices corresponding to a particular IoT device type may collect sensor data. The operation information may include information indicating a format for the sensor data, data included in the sensor data, a device to which to provide the sensor data, or the like. Here, the sensor data for the freezer IoT device type includes temperature data, the sensor data for the lightbulb IoT device type includes a power status (e.g., on/off), the sensor data for the lock IoT device type includes a lock status (e.g., locked/unlocked), and the sensor data for the thermostat IoT device type includes temperature data. A modem control device may process sensor data based on the operation information, as described in more detail below.

As further shown, the operation information may include information identifying command messages. For example, when an IoT device receives a particular command message, the IoT device may perform an operation. The operation information may identify the particular command message and the operation. In some implementations, the operation may associate the particular command message and/or the operation with an instruction. When a modem control device receives the instruction, the modem control device may cause the particular command message to be provided to an IoT device (e.g., an IoT device identified by the instruction, an IoT device associated with the modem control device, an IoT device of a particular IoT device type, an IoT device associated with a particular IoT modem, etc.). Here, the freezer IoT device type is associated with commands of "defrost" and "specify temperature." When a freezer IoT device receives a command message associated with Command 1 (e.g., defrost), the freezer IoT device may perform a defrost operation (e.g., may cause a freezer to defrost). In this way, the API permits a device to remotely control a variety of IoT devices based on command messages, which reduces processor usage and time associated with configuring the device to interact with each IoT device of the variety of IoT devices. As shown by reference number 125, the IoT device APIs may be provided to the modem control device.

As shown in FIG. 1B, and by reference number 130, an IoT developer (e.g., an application developer, an IoT device developer, etc.) may configure an application (e.g., "Vacation Home Manager") on a client device. As shown, the application may include a user interface that includes objects (e.g., buttons) to specify operations for IoT devices to perform. Here, the operations include locking a front door, unlocking a front door, and setting a temperature for a thermostat. As shown by reference number 135, the objects may be associated with IoT device API operations. For example, the "lock front door" and "unlock front door" objects are associated with the API for a lock IoT device type, and the "set thermostat temperature" object is associated with the API for a thermostat IoT device type. When a user interacts with the "lock front door" object, for example, the application may cause the client device to transmit an API instruction to the modem control device, as described in more detail below.

As shown by reference number 140, the client device may receive an interaction to add a new object to the application. As shown, the platform may permit the IoT developer to specify an IoT device API to associate with the object (e.g., freezer), and an IoT device operation to cause an IoT device to perform based on an interaction with the object (e.g., defrost). Based on the IoT device API and the IoT device operation, the platform may configure the application to include a "defrost freezer" object that is associated with the "defrost freezer" API instruction.

As shown in FIG. 1C, and by reference number 145, a user may interact with the "defrost freezer" object of the "Vacation Home Manager" application on a client device. As shown by reference number 150, based on the interaction, the client device may transmit an instruction to the modem control device. As shown, the instruction may indicate to transmit a "defrost freezer" command message to an IoT device. As shown by reference number 155, the modem control device may receive the instruction, and may determine a command message to transmit based on the IoT device API associated with the freezer IoT device type (e.g., Command Message 1).

As further shown, the modem control device may determine an IoT device to which to transmit the command message (e.g., IoT device 1). For example, the instruction may identify IoT Device 1 and/or an IoT modem associated with IoT Device 1. As another example, the modem control device may select an IoT device based on receiving the instruction from the client device (e.g., based on information associating client devices with IoT modems and/or IoT devices, etc.).

As shown by reference number 160, the modem control device may cause the IoT modem associated with IoT Device 1 to transmit Command Message 1. As shown by reference number 165, the IoT modem may transmit Command Message 1 to IoT Device 1. For example, the IoT modem may store configuration information identifying Command Message 1, and may transmit Command Message 1 based on the configuration information (e.g., via a wireless local area network, via a wired connection with IoT Device 1, etc.). As shown by reference number 170, based on Command Message 1, the IoT device may perform the defrost operation.

In this way, a modem control device causes an IoT device to perform an operation based on an IoT device API associated with the modem control device. By causing an IoT modem to transmit a command message to the IoT device, the modem control device reduces processor and storage usage by the modem control device. By providing an API for interacting with IoT devices, the modem control device conserves processor resources and time associated with configuring a client device to interact with the IoT devices.

As indicated above, FIGS. 1A-1C are provided merely as an example. Other examples are possible and may differ from what was described with regard to FIGS. 1A-1C.

Figure 2:
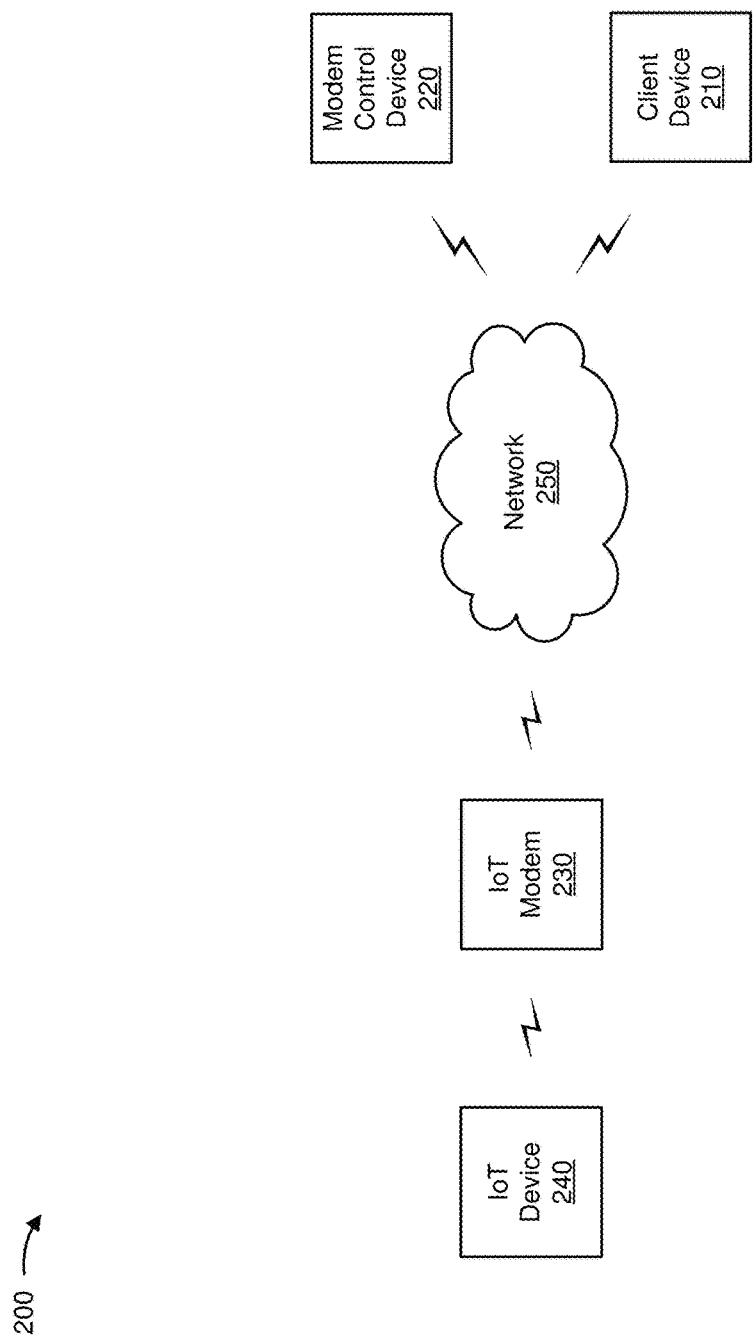
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a modem control device 220, an IoT modem 230, an IoT device 240, and a network 250. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may receive information from and/or transmit information to another device in environment 200.

Modem control device 220 may include a device capable of receiving, generating, storing, processing, and/or providing information. For example, modem control device 220 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, a server device, or a similar device. In some implementations, modem control device 220 may include a communication interface that allows modem control device 220 to receive information from and/or transmit information to another device in environment 200.

IoT modem 230 may include one or more communication and computing devices capable of communicating with IoT device 240, modem control device 220, and/or another device. For example, IoT modem 230 may include a modem, a router, a gateway, or a similar device. In some implementations, IoT modem 230 may be included in IoT device 240, or IoT device 240 may be included in IoT modem 230. Additionally, or alternatively, IoT modem 230 may communicate with one or more IoT devices 240 (e.g., via a wired connection, via a wireless connection, via a combination of wired and wireless connections, via a wireless local area network, such as a WiFi network, a Bluetooth network, a near field communication network, or the like, etc.). In some implementations, IoT modem 230 may include a communication interface that allows IoT modem 230 to receive information from and/or transmit information to another device in environment 200.

IoT device 240 may include a device capable of receiving, processing, and/or providing information. For example, IoT device 240 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), or the like. In some implementations, IoT device 240 may include a machine-to-machine communication device, such as an appliance (e.g., a refrigerator, a microwave, a stove, etc.), a medical device, a car, a light bulb, and/or any other smart device. In other words, IoT device 240 may be any "thing" in the Internet of Things (IoT). In some implementations, IoT device 240 may include a communication interface that allows IoT device 240 to receive information from and/or transmit information to another device in environment 200.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
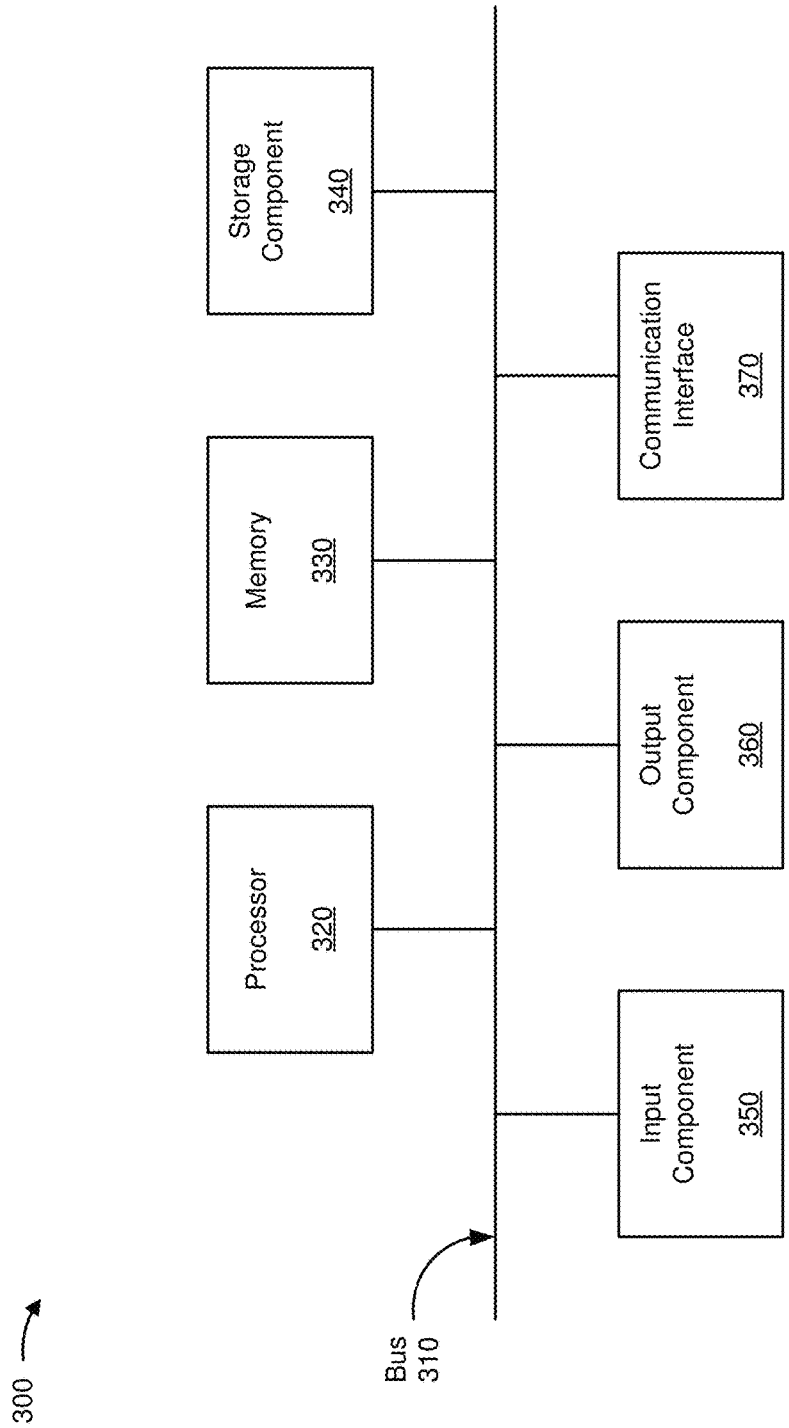
FIG. 3 is a diagram of example components of one or more devices of FIG. 2.

FIG. 3 is a diagram of example components of a device 300. Device 300 may correspond to client device 210, modem control device 220, IoT modem 230, and/or IoT device 240. In some implementations, client device 210, modem control device 220, IoT modem 230, and/or IoT device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
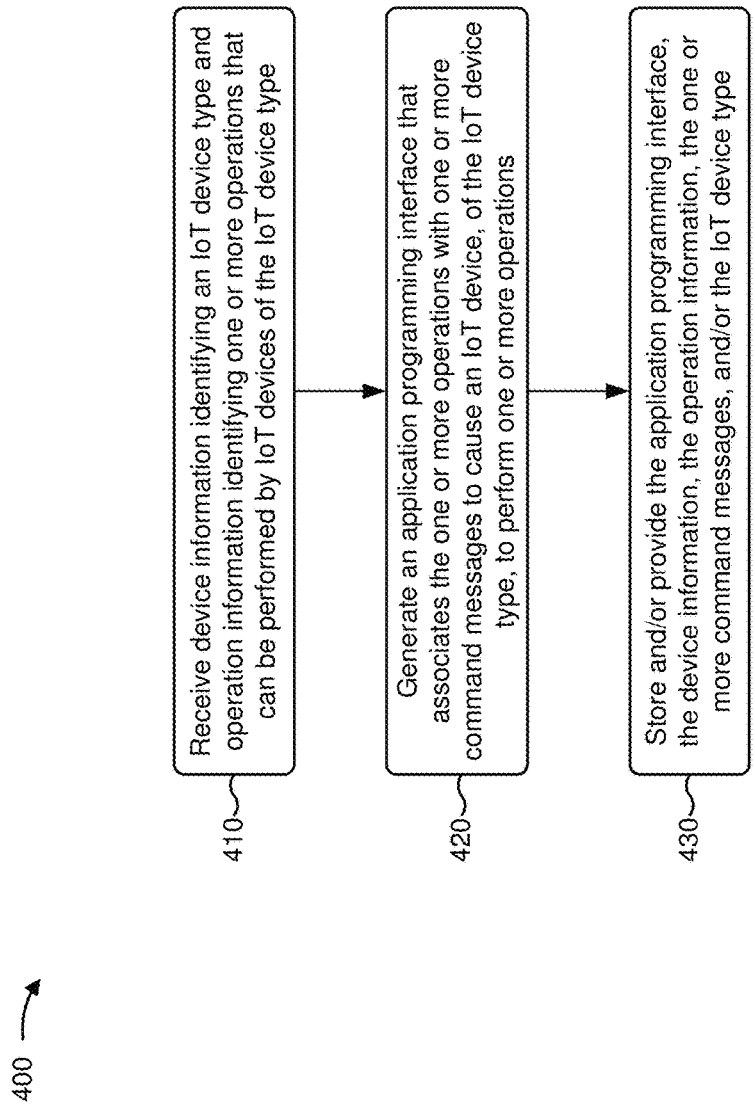
FIG. 4 is a flow chart of an example process for configuring an application programming interface for an IoT device type.

FIG. 4 is a flow chart of an example process 400 for configuring an application programming interface for an IoT device type. In some implementations, one or more process blocks of FIG. 4 may be performed by modem control device 220. In some implementations, one or more process blocks of FIG. 4 may be performed by another device or a group of devices separate from or including modem control device 220, such as client device 210, IoT modem 230, and/or IoT device 240.

As shown in FIG. 4, process 400 may include receiving device information identifying an IoT device type and operation information identifying one or more operations that can be performed by IoT devices corresponding to the IoT device type (block 410). For example, modem control device 220 may receive device information and operation information. In some implementations, modem control device 220 may receive the device information and/or the operation information from client device 210. For example, a service provider associated with modem control device 220 and/or IoT modem 230 may input the device information and/or the operation information to client device 210, and client device 210 may provide the device information and/or the operation information to modem control device 220. In some implementations, a user may input the device information and/or the operation information to modem control device 220 (e.g., via an interface of modem control device 220).

In some implementations, the device information may identify a type of IoT device 240. For example, if an IoT device type includes smart refrigerators, the device information may indicate that IoT devices 240 of the IoT device type are smart refrigerators, may identify manufacturers of IoT devices 240 of the IoT device type, device identifiers associated with IoT devices 240 of the IoT device type (e.g., serial identifiers, model identifiers, etc.), an address associated with IoT device 240 (e.g., a network address, an International Mobile Subscriber Identity, a Mobile Device Number, an Internet Protocol address, a network port, a uniform resource identifier, a network address identifier, a fully qualified domain name, etc.), a firmware version associated with IoT device 240, or the like. The service provider may provide the device information and/or operation information in order for modem control device 220 to generate an application programming interface (API) for the IoT device type.

In some implementations, the operation information may include information relating to processing IoT device data. For example, IoT device 240 may provide IoT device data to IoT modem 230. The IoT device data may include, for example, information obtained by a sensor associated with IoT device 240 (e.g., temperature information, location information, an ambient light level, a water pressure, an operational status, etc.), information indicating whether IoT device 240 is operational, information identifying whether IoT device 240 is functioning properly, or the like. Modem control device 220 may process IoT device data based on operation information associated with IoT device 240 from which the data is received, as described in more detail in connection with FIG. 6, below.

In some implementations, the operation information may identify an operation that IoT devices 240 corresponding to the IoT device type are capable of performing. For example, each IoT device 240 of a "light bulb" IoT device type may be configured to perform an operation (e.g., activating, deactivating, changing a brightness level, changing a color, etc.) based on receiving a particular command message. In that case, the operation information may identify the operation. Modem control device 220 may associate the operation with the particular command message, as described in more detail below.

In some implementations, an IoT device type may correspond to IoT devices 240 from a particular manufacturer, from a particular generation of IoT device 240, from a particular family of IoT devices 240, or the like. For example, an IoT device type may include all smart light bulbs, may include smart light bulbs manufactured by a particular manufacturer, or the like. In this way, modem control device 220 can cause IoT modem 230 to control any IoT device 240 corresponding to the IoT device type, which reduces processor usage in connection with communicating with different IoT devices 240 corresponding to the IoT device type. In some implementations, a service provider (e.g., a service provider associated with modem control device 220 and/or IoT modem 230) may provide device information and operation information for an IoT device type, and may encourage IoT device designers to design IoT devices 240, of the IoT device type, that conform to the device information and the operation information. In this way, processor usage and time spent configuring devices to interact with IoT devices 240 of the IoT device type are reduced.

As further shown in FIG. 4, process 400 may include generating an application programming interface that associates the one or more operations with one or more instructions (block 420). For example, IoT modem 230 may be capable of transmitting a variety of command messages. A command message may include a string of one or more bits, bytes, characters, or the like. IoT device 240 may be configured to perform a particular operation when IoT device 240 receives a particular command message. Modem control device 220 may associate one or more operations that IoT device 240 is capable of performing, with one or more command messages that, when received by IoT device 240, cause IoT device 240 to perform a respective operation of the one or more operations.

Modem control device 220 may generate an API that associates operations and/or command messages for a particular IoT device type with instructions to be provided to modem control device 220. When modem control device 220 receives an instruction that is associated with a particular operation, modem control device 220 may cause IoT modem 230 to transmit a corresponding command string to IoT device 240 to cause IoT device 240 to perform the particular operation. In this way, modem control device 220 configures an API for interacting with IoT devices 240 of a particular IoT device type, which conserves processor resources that would otherwise be used to configure a device (e.g., client device 210) to interact with each different IoT device 240 of the IoT device type.

In some implementations, modem control device 220 may generate the API based on command messages that IoT modem 230 is configured to transmit. For example, IoT modem 230 may be configured to provide a particular set of command messages. Modem control device 220 may receive information identifying the particular set of command messages. Modem control device 220 may receive information identifying particular operations, and may associate the particular operations with command messages of the particular set of command messages. For example, modem control device 220 may provide a user interface identifying each command message of the set, and a user may input a corresponding operation in association with each command. As another example, modem control device 220 may receive information identifying a set of operations, and may automatically match the operations of the set with command messages of the particular set of command messages.

Modem control device 220 may generate the API by matching instructions with command messages and/or operations. In some implementations, modem control device 220 may match the instructions with the command messages and/or operations automatically. Additionally, or alternatively, modem control device 220 may match the command messages and/or operations with the respective instructions based on a user input. For example, modem control device 220 may provide a user interface for a user to input instructions to be associated with respective command messages and/or respective operations.

As further shown in FIG. 4, process 400 may include storing and/or providing the application programming interface, the device information, the operation information, the one or more command messages, and/or the IoT device type (block 430). For example, modem control device 220 may store and/or provide the API, the device information, the operation information, the one or more command messages, and/or the IoT device type. In some implementations, modem control device 220 may store the API locally, and may perform actions based on the API (e.g., based on receiving instructions associated with the API, based on receiving and/or processing IoT device data based on the API, etc.), as described in more detail below.

In some implementations, modem control device 220 may provide the API to an application provider. The application provider may configure an application (e.g., for execution on client device 210) based on the API. For example, the application provider may generate a user interface for an application based on the API. The user interface may include one or more objects that are associated with one or more operations to be performed by IoT devices 240, as described in more detail in connection with FIGS. 1A-1C, above. When the user interface receives an interaction with an object, of the one or more objects, the application may cause a device (e.g., a device executing the application, a network device, etc.) to transmit a corresponding instruction, of the API, to modem control device 220. The corresponding instruction may cause modem control device 220 to cause IoT device 240 to perform an operation.

By generating the API, modem control device 220 permits a variety of client devices 210 to control IoT devices 240 via modem control device 220, without being individually configured to transmit specific command messages to specific IoT devices 240, which conserves processor power and programming resources for the various client devices 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
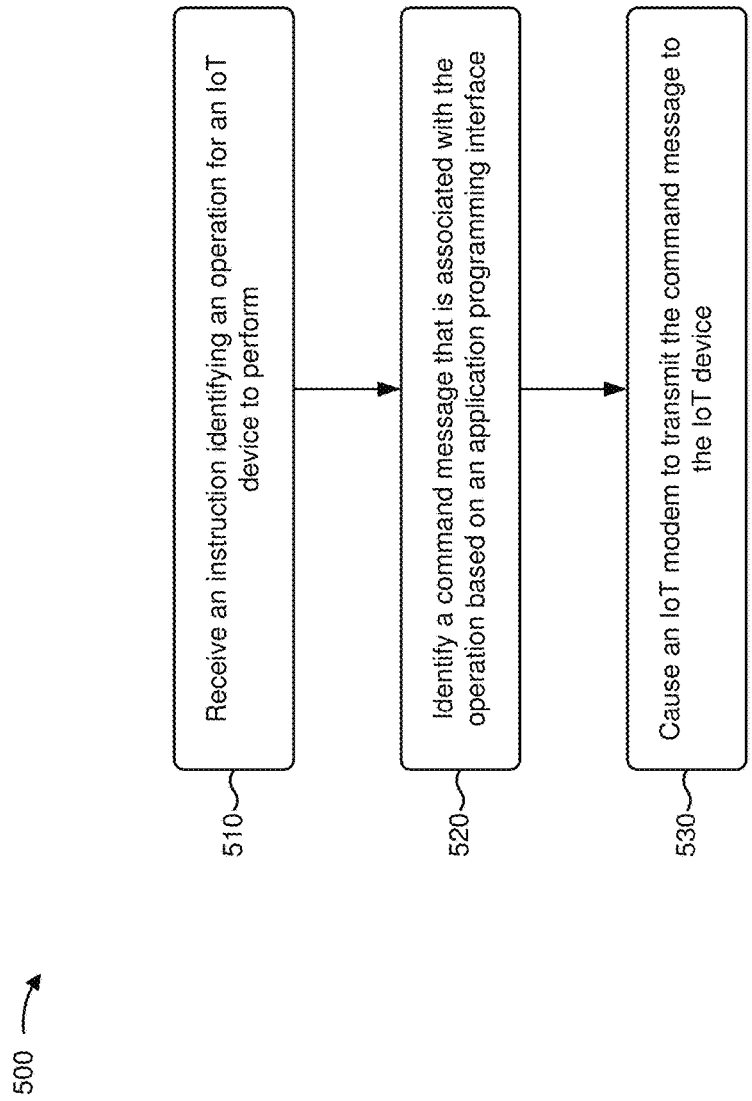
FIG. 5 is a flow chart of an example process for interacting with an IoT device based on an application programming interface.

FIG. 5 is a flow chart of an example process 500 for interacting with an IoT device based on an application programming interface. In some implementations, one or more process blocks of FIG. 5 may be performed by modem control device 220. In some implementations, one or more process blocks of FIG. 5 may be performed by another device or a group of devices separate from or including modem control device 220, such as client device 210, IoT modem 230, and/or IoT device 240.

As shown in FIG. 5, process 500 may include receiving an instruction identifying an operation for an IoT device to perform (block 510). For example, modem control device 220 may receive an instruction identifying an operation for IoT device 240 to perform. In some implementations, modem control device 220 may receive the instruction from client device 210. When a user interacts with an application executing on client device 210, the application may cause client device 210 to transmit the instruction to modem control device 220. The instruction may be associated with an API generated by modem control device 220 based on device information, operation information, and/or one or more IoT device types, as described in more detail in connection with FIG. 4, above.

As further shown in FIG. 5, process 500 may include identifying a command message that is associated with the operation based on an application programming interface (block 520). For example, modem control device 220 may identify a command message that, when received by IoT device 240, may cause IoT device 240 to perform the operation. In some implementations, modem control device 220 may identify the command message based on an API. For example, the API may identify the command message and the corresponding operation, and may indicate that the received instruction is associated with the operation and/or command message. In some implementations, modem control device 220 may identify the command message based on an IoT device type of IoT device 240. For example, modem control device 220 may store information associating IoT device types with command messages, and may identify the command message based on an IoT device type associated with IoT device 240.

As further shown in FIG. 5, process 500 may include causing an IoT modem to transmit the command message to the IoT device (block 530). For example, modem control device 220 may cause IoT modem 230 to transmit the command message to IoT device 240. In some implementations, modem control device 220 may transmit the instruction to IoT modem 230, and the instruction may cause IoT modem 230 to transmit the command message to IoT device 240. In some implementations, modem control device 220 may cause IoT device 240 to transmit command messages to multiple IoT devices 240 (e.g., based on receiving multiple instructions to provide command messages to the multiple IoT devices 240, based on receiving a single instruction to provide command messages to the multiple IoT devices 240, etc.).

In some implementations, modem control device 220 may cause IoT modem 230 to transmit a command message by providing the command message to IoT modem 230. For example, IoT modem 230 may receive a command message for IoT device 240, and may provide the command message to IoT device 240 (e.g., via a wireless local area network, via a wired connection, etc.). In this way, IoT modem 230 conserves processor resources by forwarding a command message from modem control device 220, and conserves storage space that would otherwise be used to store information associating instructions from modem control device 220 with command messages.

Additionally, or alternatively, modem control device 220 may cause IoT modem 230 to transmit the command message by providing an instruction to IoT modem 230 (e.g., an instruction received by modem control device 220 based on an API associated with modem control device 220 and/or IoT modem 230, an instruction generated by modem control device 220 based on receiving an instruction associated with the API, etc.). IoT modem 230 may receive the instruction and may determine that the instruction is associated with the command message (e.g., based on the instruction identifying the command message, based on information associating the instruction with the command message, etc.). IoT modem 230 may transmit the command message to IoT device 240 based on receiving the instruction. IoT device 240 may receive the command message, and may perform the operation based on the command message.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for processing IoT device data based on an IoT device type. In some implementations, one or more process blocks of FIG. 6 may be performed by modem control device 220. In some implementations, one or more process blocks of FIG. 6 may be performed by another device or a group of devices separate from or including modem control device 220, such as client device 210, IoT modem 230, and/or IoT device 240.

As shown in FIG. 6, process 600 may include receiving IoT device data (block 610). For example, modem control device 220 may receive IoT device data. Modem control device 220 may receive the IoT device data from IoT device 240 (e.g., via IoT modem 230). For example, one or more IoT devices 240 may provide IoT device data to IoT modem 230 (e.g., continuously, based on receiving a request for IoT device data from IoT modem 230, periodically, such as every thirty seconds, every five minutes, once per day, or the like, at a scheduled time, etc.). IoT modem 230 may collect the IoT device data, and may provide the IoT device data to modem control device 220.

In some implementations, IoT modem 230 may provide the IoT device data in a batch. For example, IoT modem 230 may collect a certain quantity of IoT device data, may collect the IoT device data for a certain amount of time, may collect IoT device data from all connected IoT devices 240, or the like. IoT modem 230 may provide the collected IoT device data to modem control device 220 in a batch. In this way, IoT modem 230 conserves processor resources and network resources of IoT modem 230 by reducing a quantity of messages transmitted by IoT modem 230. In some implementations, IoT modem 230 may provide the IoT device data based on receiving a request for IoT device data from modem control device 220, which conserves processor and storage resources of modem control device 220 that would otherwise be used for processing and storing unwanted IoT device data. In some implementations, IoT modem 230 may provide the IoT device data continuously.

As further shown in FIG. 6, process 600 may include identifying an IoT device type that is associated with the IoT device data (block 620). For example, modem control device 220 may determine an IoT device type that is associated with the IoT device data. In some implementations, modem control device 220 may determine the IoT device type based on information received in association with the IoT device data. For example, the IoT device data may include information identifying IoT device 240 that collected the IoT device data (e.g., an IoT device type corresponding to IoT device 240, a device identifier associated with IoT device 240, etc.), and modem control device 220 may determine the IoT device type based on the information identifying IoT device 240.

Additionally, or alternatively, modem control device 220 may store information identifying one or more IoT devices 240 with which IoT modem 230 is connected. For example, modem control device 220 may obtain configuration information from IoT modem 230. The configuration information may identify IoT devices 240 with which IoT modem 230 is connected, may identify IoT device types corresponding to the IoT devices 240, and/or may identify ports, network addresses, or the like, associated with the IoT devices 240. Modem control device 220 may receive IoT device data that includes information identifying a port, network address, or the like, of IoT device 240, and may determine the IoT device type based on the port, network address, or the like. In this way, modem control device 220 determines an IoT device type for IoT device data based on stored configuration information, which reduces processor and/or network requirements for IoT modem 230 to provide the IoT device type.

As further shown in FIG. 6, process 600 may include processing the IoT device data based on the IoT device type (block 630). For example, modem control device 220 may process the IoT device data based on the IoT device type. In some implementations, modem control device 220 may store operation information that is associated with the IoT device type. The operation information may include instructions for processing the IoT device data. For example, the operation information may specify a particular data format for the IoT device data, a particular messaging protocol associated with the IoT device data, or the like. Modem control device 220 may process the IoT device data based on the operation information.

As an example, assume that modem control device 220 receives an unstructured stream of bits from IoT device 240 (e.g., a thermostat) via IoT modem 230. Assume further that modem control device 220 stores operation information for a thermostat IoT device type. The operation information may specify instructions for processing the unstructured stream of bits. For example, the operation information may specify that a particular string in the unstructured stream of bits identifies a temperature measured by IoT device 240, an operational status of IoT device 240, or the like. Modem control device 220 may process the unstructured stream of bits to identify the external temperature, operational status, or the like.

As further shown in FIG. 6, process 600 may include providing processed data (block 640). For example, modem control device 220 may provide processed data that is generated based on processing the IoT device data. In some implementations, modem control device 220 may store the processed data locally. Additionally, or alternatively, modem control device 220 may provide the processed data for storage by another device (e.g., client device 210, a server device, etc.). In some implementations, modem control device 220 may provide the processed data to client device 210. For example, client device 210 may execute an application for interacting with IoT devices 240. Modem control device 220 may provide the processed data to client device 210 for use by the application (e.g., for display by the application, for storage in association with the application, etc.).

In some implementations, modem control device 220 may provide the processed data based on an API. For example, the API may specify a particular client device 210 to which to provide the processed data. In that case, modem control device 220 may provide the processed data to the particular client device 210 (e.g., for display by an application executing on the particular client device 210, for storage by the particular client device 210, etc.). As another example, the API may specify a particular format in which to provide the processed data (e.g., a particular header for the processed data, a particular message size, a particular compression algorithm to apply to the processed data, etc.), and modem control device 220 may provide the processed data in the particular format.

In some implementations, modem control device 220 may provide processed data from multiple IoT devices 240 to a particular client device 210. For example, the particular client device 210 may execute an application that is associated with one or more IoT modems 230 and two or more IoT devices 240 (e.g., two or more IoT devices 240 that are connected with a single IoT modem 230, two or more IoT devices 240 that are connected with multiple IoT modems 230, etc.). Modem control device 220 may receive and process IoT device data from the one or more IoT modems 230, and may provide the IoT device data to the particular client device 210 based on the application being associated with the one or more IoT modems 230. In this way, modem control device 220 conserves processor resources of the particular client device 210 by processing and providing IoT device data from multiple IoT devices 240. Further, modem control device 220 conserves time and effort that would otherwise be used to configure client device 210 to interact with the multiple IoT devices 240.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a modem control device causes an IoT device to perform an operation based on an IoT device API associated with the modem control device. By causing an IoT modem to transmit a command message to the IoT device, the modem control device reduces processor and storage usage by the modem control device. By providing an API for interacting with IoT devices, the modem control device conserves processor resources and time associated with configuring a client device to interact with the IoT devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a client device, device information and operation information relating to an Internet of Things (IoT) device type,
the IoT device type corresponding to IoT devices that are configured to perform a particular operation based on receiving a particular command message,
the device information identifying one or more IoT devices of the IoT device type, and
the operation information received from the client device identifying one or more operations that the one or more IoT devices are capable of performing;
generate an application programming interface (API) based on the operation information received from the client device,
the API associating the one or more operations with one or more respective instructions,
a first instruction, of the one or more respective instructions, when received by the device, causing the device to cause a corresponding command message to be transmitted to a first IoT device of the one or more IoT devices;
store or provide the API,
the API permitting the client device to control operation of the one or more IoT devices based on the API;
receive a second instruction that is associated with a command message based on the API; and
cause the command message to be provided to a second IoT device of the one or more IoT devices,
the second IoT device being identified by the second instruction.

2. The device of claim 1, where the one or more processors, when generating the API, are to:
obtain information identifying one or more command messages,
the one or more command messages, when received by a third IoT device of the IoT device type, causing the third IoT device to perform one or more respective
operations of the one or more operations;
associate the one or more command messages with the
one or more respective operations; and
associate the one or more respective instructions with the
one or more command messages and the one or more
respective operations.

3. The device of claim 2, where the one or more processors, when associating the one or more respective instructions with the one or more command messages and the one or more respective operations, are to:
provide a user interface that identifies an operation of the one or more respective operations;
receive an interaction with the user interface identifying a fourth instruction of the one or more respective instructions; and
associate the operation with the fourth instruction based on the interaction.

4. The device of claim 1, where the one or more processors, when causing the command message to be provided, are to:
cause an IoT modem to provide the command message to the second IoT device.

5. The device of claim 1, where the one or more processors are to:
receive IoT device data from a third IoT device,
the third IoT device being associated with the IoT device type;
determine that the third IoT device is associated with the IoT device type;
process the IoT device data, based on the operation information received from the client device relating to the IoT device type, to generate processed data; and
provide the processed data.

6. The device of claim 5, where the IoT device data includes at least one of:
information obtained by a sensor associated with the third IoT device,
information identifying a location of the third IoT device,
information identifying an operational status of the third IoT device,
information identifying whether the third IoT device is operational, or
information identifying whether the third IoT device is functioning properly.

7. The device of claim 1, where the one or more IoT devices include a plurality of IoT devices; and
where the one or more processors are to:
receive the first instruction; and
cause, based on the first instruction, an IoT modem to transmit the corresponding command message to each IoT device of the plurality of IoT devices.

8. A non-transitory computer-readable medium storing instructions, the instructions comprising:
one or more instructions that, when executed by one or more processors of a device, cause the one or more processors to:
receive, from a client device, device information and operation information relating to an Internet of Things (IoT) device type,
the IoT device type corresponding to IoT devices that are configured to perform a particular operation based on receiving a particular command message,
the device information identifying a plurality of IoT devices of the IoT device type, and
the operation information received from the client device identifying one or more operations that can be performed by a first IoT device of the plurality of IoT devices;
generate an application programming interface (API) based on the operation information received from the client device,
the API associating the one or more operations with one or more respective instructions,
a first instruction, of the one or more respective instructions, when received by the device, causing the device to cause a corresponding command message to be transmitted to the first IoT device;
store or provide the API,
the API permitting the client device to control operation of the plurality of IoT devices based on the API;
receive a second instruction that is associated with the API;
identify a command message that is associated with the second instruction based on the API; and
cause the command message to be provided to a second IoT device of the plurality of IoT devices.

9. The non-transitory computer-readable medium of claim 8, where the device is a first device; and
where the one or more instructions, when executed by the one or more processors, cause the one or more processors to:
receive IoT device data from a third IoT device,
the third IoT device corresponding to the IoT device type;
process the IoT device data based on the operation information received from the client device to generate processed data; and
provide the processed data to a second device.

10. The non-transitory computer-readable medium of claim 9, where the one or more instructions, that cause the one or more processors to process the IoT device data, cause the one or more processors to:
process the IoT device data based on the third IoT device being associated with the IoT device type.

11. The non-transitory computer-readable medium of claim 9, where the one or more instructions, that cause the one or more processors to provide the processed data to the second device, cause the one or more processors to:
provide the processed data to the second device based on the API.

12. The non-transitory computer-readable medium of claim 9, where the one or more instructions, that cause the one or more processors to receive the IoT device data, cause the one or more processors to:
receive the IoT device data from multiple IoT devices,
the multiple IoT devices being included in the plurality of IoT devices;
process the IoT device data from the multiple IoT devices to generate the processed data; and
provide the processed data to the second device.

13. The non-transitory computer-readable medium of claim 8, where the device information for a third IoT device, of the plurality of IoT devices, includes information identifying one or more of:
a manufacturer of the third IoT device,
a model identifier of the third IoT device,
a serial identifier of the third IoT device,
a firmware version associated with the third IoT device, an International Mobile Subscriber Identity of the third IoT device,
an Internet Protocol address of the third IoT device,
a network port of the third IoT device,
a uniform resource identifier associated with the third IoT device,
a network address identifier for the third IoT device, or
a fully qualified domain name for the third IoT device.

14. The non-transitory computer-readable medium of claim 8, where the one or more instructions, that cause the one or more processors to generate the API, cause the one or more processors to:
obtain information identifying one or more command messages,
the one or more command messages, when received by a third IoT device of the IoT device type, causing the third IoT device to perform one or more respective operations of the one or more operations;
associate the one or more command messages with the one or more respective operations; and
associate the one or more respective instructions with the one or more command messages and the one or more respective operations.

15. A method, comprising:
receiving, by a device and from a client device, device information and operation information relating to an Internet of Things (IoT) device type,
the IoT device type corresponding to IoT devices that are configured to perform a particular operation based on receiving a particular command message,
the device information identifying one or more IoT devices of the IoT device type, and
the operation information received from the client device identifying one or more operations that can be performed by the one or more IoT devices;
generating, by the device, an application programming interface (API) based on the operation information received from the client device,
the API associating the one or more operations with one or more respective instructions,
a first instruction, of the one or more respective instructions, when received by the device, causing the device to cause a corresponding command message to be transmitted to a first IoT device of the one or more IoT devices;
storing or providing, by the device, the API,
the API permitting the client device to control operation of the one or more IoT devices based on the API;
receiving, by the device, a second instruction that is associated with the API;
identifying, by the device, a command message that is associated with the second instruction based on the API; and
causing, by the device, the command message to be provided to a second IoT device of the one or more IoT devices.

16. The method of claim 15, where the one or more IoT devices include a plurality of IoT devices; and
where the method further comprises:
receiving the first instruction; and
causing, based on the first instruction, an IoT modem to transmit the corresponding command message to each IoT device of the plurality of IoT devices.

17. The method of claim 15, where the device is a first device; and
where the method further comprises:
receiving IoT device data from a third IoT device of the one or more IoT devices;
processing the IoT device data based on the operation information received from the client device to generate processed data; and
providing the processed data to a second device.

18. The method of claim 17, further comprising:
determining that the third IoT device corresponds to the IoT device type based on the device information associated with the third IoT device,
the device information identifying the third IoT device as one of the one or more IoT devices.

19. The method of claim 17, where receiving the IoT device data comprises:
requesting the IoT device data based on the device information identifying the third IoT device; and
receiving the IoT device data based on requesting the IoT device data.

20. The method of claim 15, where generating the API comprises:
obtaining information identifying one or more command messages,
the one or more command messages, when received by a third IoT device of the IoT device type, causing the third IoT device to perform one or more respective operations of the one or more operations;
associating the one or more command messages with the one or more respective operations; and
associating the one or more respective instructions with the one or more command messages and the one or more respective operations.

* * * * *